(12) United States Patent  
Igawa et al.

(10) Patent No.: US 11,063,319 B2  
(45) Date of Patent: Jul. 13, 2021

(54) SEPARATOR FOR ELECTROCHEMICAL ELEMENT AND ELECTROCHEMICAL ELEMENT

(71) Applicant: NIPPON KODOSHI CORPORATION, Kochi (JP)

(72) Inventors: Atsushi Igawa, Kochi (JP); Takumi Ichimura, Kochi (JP); Gaku Matsuoka, Kochi (JP); Norihiro Wada, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 40 days.

(21) Appl. No.: 15/760,705

(22) PCT Filed: Sep. 27, 2016

(86) PCT No.: PCT/JP2016/078402  
§ 371 (c)(1),  
(2) Date: Mar. 16, 2018

(87) PCT Pub. No.: WO2017/057336  
PCT Pub. Date: Apr. 6, 2017

(65) Prior Publication Data  
US 2018/0287119 A1    Oct. 4, 2018

(30) Foreign Application Priority Data

Sep. 28, 2015 (JP) .............................. JP2015-189116

(51) Int. Cl.  
*H01M 50/00* (2021.01)  
*H01M 50/44* (2021.01)  
*H01G 9/02* (2006.01)  
*H01G 11/52* (2013.01)  
*H01M 50/429* (2021.01)  
*H01M 50/409* (2021.01)  
*H01G 4/16* (2006.01)

(52) U.S. Cl.  
CPC .............. *H01M 50/44* (2021.01); *H01G 9/02* (2013.01); *H01G 11/52* (2013.01); *H01M 50/409* (2021.01); *H01M 50/4295* (2021.01); *H01G 4/16* (2013.01); *Y02E 60/13* (2013.01)

(58) Field of Classification Search  
CPC ........ H01M 2/1626; H01M 2/16; H01G 9/02; H01G 4/16; Y02E 60/13  
See application file for complete search history.

(56) References Cited

U.S. PATENT DOCUMENTS

| 6,074,523 | A | 6/2000 | Mizobuchi et al. |
| 2002/0004973 | A1 | 1/2002 | Suhara et al. |
| 2007/0287062 | A1* | 12/2007 | Tsukuda ................... H01G 9/02 429/129 |
| 2009/0036015 | A1* | 2/2009 | Nhan .................... D04H 1/4234 442/335 |
| 2012/0121975 | A1* | 5/2012 | Rajaram ................. C03C 25/66 429/203 |
| 2013/0288133 | A1* | 10/2013 | Imai ....................... D04H 1/425 429/255 |
| 2015/0010798 | A1* | 1/2015 | Sawai ................. H01M 2/1653 429/94 |
| 2015/0010828 | A1* | 1/2015 | Kubo ................... H01M 2/1626 429/246 |
| 2015/0287536 | A1 | 10/2015 | Tanaka et al. |

FOREIGN PATENT DOCUMENTS

| EP | 3 125 335 A1 | 2/2017 |
| JP | 5-267103 A | 10/1993 |
| JP | 2000-3834 A | 1/2000 |
| JP | 2010-239094 A | 10/2010 |
| JP | 2011-249008 A | 12/2011 |
| JP | 2012-221566 A | 11/2012 |
| JP | 2014-53259 A | 3/2014 |
| JP | 2014-56953 A | 3/2014 |
| JP | 2014-123607 A | 7/2014 |
| JP | 2015-162281 A | 9/2015 |

OTHER PUBLICATIONS

International Search Report dated Dec. 20, 2016 in PCT/JP2016/078402 filed Sep. 27, 2016.  
Extended European Search Report dated May 14, 2019 in European Patent Application No. 16851507.0, 9 pages.

* cited by examiner

*Primary Examiner* — Cynthia H Kelly  
*Assistant Examiner* — Monique M Wills  
(74) *Attorney, Agent, or Firm* — Oblon, McClelland, Maier & Neustadt, L.L.P.

(57) ABSTRACT

Provided is a separator for an electrochemical element having exceptional strength and shielding performance, a small thickness, and low resistance. A separator for an electrochemical element interposed between a pair of electrodes and capable of holding an electrolytic solution containing an electrolyte, wherein the separator for an electrochemical element comprises a regenerated cellulose fiber having an average fiber length of 0.25-0.80 mm and an average fiber width of 3-35 μm, and in which the value calculated by dividing the average fiber length by the average fiber width is 15-70.

3 Claims, No Drawings

SEPARATOR FOR ELECTROCHEMICAL ELEMENT AND ELECTROCHEMICAL ELEMENT

TECHNICAL FIELD

The present invention relates to a separator for an electrochemical element and an electrochemical element including the separator.

BACKGROUND ART

Examples of the electrochemical element include aluminum electrolytic capacitors, electroconductive polymeric aluminum solid electrolytic capacitors, electroconductive polymeric hybrid aluminum electrolytic capacitors, electric double layer capacitors, lithium ion capacitors, lithium ion secondary batteries, and lithium primary batteries.

Such electrochemical elements are used in various fields, such as automotive devices and digital devices, renewable energy-related devices for wind power generation and photovoltaic power generation, and communication devices, such as smart meters.

There has been a demand for the electrochemical element to achieve further improvement in charge-discharge characteristics, output properties, and the cycle life.

To achieve this, resistance reduction of an electrochemical element is effective. A high internal resistance value results in an increase in a loss due to the resistance in charging or discharging. In addition, the loss generates heat, and the generated heat serves as a factor directly affecting the life. Low generation of heat leads directly to prolongation of the life, and thus there is an ever increasing demand for resistance reduction.

There has also been a persistent demand for size reduction of an electrochemical element in order to reduce installation space.

To satisfy such requirements for an electrochemical element, resistance reduction and thickness reduction of the separator is required.

In an electrochemical element, the main roles of the separator are separation of both electrodes from each other and retention of an electrolytic solution. The separator is required to have high denseness to separate both electrodes from each other. In addition, the material of the separator needs to have hydrophilicity and oleophilicity for retaining various kinds of electrolytic solution and to have electrical insulating properties.

Thickness reduction of the separator is effective for the size reduction, capacity increase, and resistance reduction of the electrochemical element. When electrode materials with the same size are used, an electrochemical element formed by using a thinner separator can be an electrochemical element with a smaller outside diameter. When a thinner separator is wound more times, the electrode surface area increases, thereby achieving the capacity increase of an electrochemical element. In addition, the use of a thin separator decreases the distance between both electrodes and lowers the resistance of an electrochemical element.

However, when separator thickness is reduced, strength and shielding performance of a separator are simultaneously reduced. Therefore, the use of a thin separator causes problems, such as increases in the number of short-circuit defects and in the amount of leakage current of the electrochemical element and breakage of the separator in a process of producing an electrochemical element.

The increase in density is effective to improve the strength and denseness of a separator. The increase in density addresses problems, such as short-circuit defects and amount of leakage current of the electrochemical element and breakage of the separator in a process of producing an electrochemical element, but increases resistance of an electrochemical element.

As described above, there has been a demand for a separator, as a separator for an electrochemical element, having high shielding performance and small thickness while having low resistance.

Several types of forms for separators for an electrochemical element have been proposed to improve the properties (see PTL 1 to PTL 5, for example).

CITATION LIST

Patent Literature

PTL 1: Japanese Unexamined Patent Application Publication No. 2000-3834
PTL 2: Japanese Unexamined Patent Application Publication No. 2014-123607
PTL 3: Japanese Unexamined Patent Application Publication No. 2012-221566
PTL 4: Japanese Unexamined Patent Application Publication No. 2010-239094
PTL 5: Japanese Unexamined Patent Application Publication No. 2015-162281

SUMMARY OF INVENTION

Technical Problem

PTL 1 proposes a separator having high denseness while having low resistance. The separator of PTL 1 is nonwoven obtained by treating (beating) solvent-spun cellulose fibers with some cutting tool in water to produce fine fibrils having a size of several tens of nanometers to several micrometers and processing the fibrillated solvent-spun cellulose fibers by a papermaking process using a paper wetting apparatus.

The solvent-spun cellulose fibers and their fibrils have high stiffness and are less likely to be flattened. Thus, when such fibers and fibrils are made to be nonwoven, the fibers and fibrils do not bind together so as to make a film, which is different from fibrillated fine fibers of natural fibers.

Accordingly, the separator obtained by beating the solvent-spun cellulose fibers and treating them by a papermaking process has fine fibers that are independent from each other and entangled with each other. Such a structure including the entanglement and an infinite number of point attachments (hydrogen bonds) provides a separator with considerably high denseness.

It is disclosed that an electric double layer capacitor produced by using the separator including the beaten solvent-spun cellulose fibers has improved properties such as internal resistance, the ratio of short-circuit defects, and the amount of leakage current.

However, in trying to further achieve the reduction of the thickness and density of the separator to reduce the resistance of an electrochemical element, which has been highly demanded, when a separator including solvent-spun cellulose fibers that can be beaten as in PTL 1 is used, the separator is sometimes broken in a process of winding or stacking an electrochemical element because the separator has low tensile strength.

The reason for this is as follows.

As described above, strength of cellulose wetlaid nonwoven (paper) is known to be highly affected by physical entanglement of fibers and hydrogen bonds between fibers. The fibers and fibrils of wetlaid nonwoven including beaten regenerated cellulose have high stiffness, and thus the surfaces of the fibrils are not bound with each other, and the strength is less likely to be improved by hydrogen-bonding strength between the fibers, compared with natural cellulose fibers in which surfaces are bound with each other. Therefore, a separator of the nonwoven is likely to be broken. If physical entanglement of the fibers is increased in an amount to improve the strength by extending the length of the fibers, homogeneity of the sheet is deteriorated, thereby causing increases in the number of short-circuit defects and in the amount of leakage current of the electrochemical element. Therefore, the thickness of the separator including solvent-spun cellulose fibers is difficult to be further reduced.

PTL 2 proposes a method of mixing, for papermaking, regenerated cellulose fibers and beaten natural cellulose fibers to improve tearing strength of a separator to suppress breakage of the separator in a process of producing an aluminum electrolytic capacitor. When natural cellulose fibers account for 10 to 30 mass % and beaten regenerated cellulose fibers account for the balance, the natural cellulose fibers form a skeleton, and the beaten regenerated cellulose fibers fill between the skeletons to thereby provide a separator having excellent tearing strength and denseness.

However, when the natural cellulose fibers are mixed as in PTL 2, a problem such as deterioration of impedance occurs.

The reason for this is as follows.

From regenerated cellulose fibers, fibrils having high stiffness and a substantially perfect-circle section can be obtained. On the other hand, natural cellulose fibers have a larger and flatter section and a lower stiffness than regenerated cellulose fibers and thus bind with each other so as to form a film to thereby block the flow of ions. As a result, the resistance of an electrochemical element produced by using the separator that includes natural cellulose fibers and beaten materials of regenerated cellulose fibers deteriorates.

Furthermore, the separator of PTL 2 has lower denseness than the separator formed of highly beaten regenerated cellulose fibers alone as in PTL 1. Therefore, when the separator of PTL 2 is used in an electrochemical element, the ratio of short-circuit defects also increases. If the natural cellulose fibers are further beaten to increase the denseness of the separator, the resistance considerably deteriorates.

PTL 3 proposes a separator that is produced by using regenerated cellulose fibers in which freeness and the length of the fibers are controlled and that has excellent strength when an electrolytic solution adheres to the separator.

However, the binding force between the fibers in the separator described in PTL 3 is weaker than that of the separator described in PTL 2. Therefore, the separator can endure deformation that is not accompanied with violent motion, such as swelling and shrinking caused, for example, by heat after being impregnated with an electrolytic solution when an electrochemical element is formed; however the separator is broken in a process with large motion, such as a winding process of the electrochemical element.

PTL 4 proposes a regenerated cellulose porous membrane separator as a thin and dense separator. PTL 4 discloses that a porous membrane including regenerated cellulose has higher strength than a nonwoven separator including regenerated cellulose fibers, such as the separator in PTL 1.

However, a regenerated cellulose porous membrane such as the separator in PTL 4 has a film structure in which the whole cellulose forming the separator is integrated together. This results in the resistance deterioration from the same reason as that of the separator of PTL 2.

If the thickness and density of the separator are further reduced to reduce the resistance of the separator, the shielding performance of the separator decreases, and thus the number of short-circuit defects and the amount of leakage current increase when the separator is used in an electrochemical element.

PTL 5 proposes a separator having small thickness and high mechanical strength, in which the fiber diameter of solvent-spun regenerated cellulose fibers is specified. The separator, which includes synthetic fibers and natural fibers as essential components in addition to the solvent-spun regenerated cellulose, has lower retainability of an electrolytic solution and higher resistance of the separator than a separator formed of solvent-spun regenerated cellulose alone to thereby cause a problem such as resistance deterioration of the electrochemical element.

As described above, the shielding performance, resistance, and strength required for a separator have a complex and trade-off relationship. Accordingly, a thin separator that has achieved enhancement of all those properties simultaneously has been difficult to be obtained.

The present invention has been made in view of the foregoing problems. An object of the present invention is to provide a separator for an electrochemical element, the separator having high strength, excellent shielding performance, small thickness, and low resistance. Another object is to achieve the size reduction, capacity increase, and life extension of an electrochemical element by using the separator.

Solution to Problem

The separator for an electrochemical element according to the present invention is a separator interposed between a pair of electrodes and having retainability of an electrolytic solution including an electrolyte, the separator including a regenerated cellulose fiber having an average fiber length of 0.25 to 0.80 mm, an average fiber width of 3 to 35 µm, and a value of 15 to 70, the value being calculated by dividing the average fiber length by the average fiber width.

The separator for an electrochemical element according to the present invention of the present invention preferably has a thickness of 3 to 30 µm.

The electrochemical element according to the present invention includes the separator for an electrochemical element according to the present invention. The electrochemical element according to the present invention is preferably an aluminum electrolytic capacitor, an electric double layer capacitor, a lithium ion capacitor, a lithium primary battery, or a lithium ion secondary battery.

Advantageous Effects of Invention

According to the present invention, it is possible to increase the denseness of a separator including beaten regenerated cellulose fibers without deteriorating the strength, thereby providing a separator having high shielding performance even with small thickness. Accordingly, a separator that has sufficient shielding performance to prevent short-circuit defects of an electrochemical element and furthermore high strength can be obtained even if the separator has a small thickness of 3 to 30 μm.

The use of the separator according to the present invention achieves the resistance reduction, size reduction, capacity increase, and life extension of the electrochemical element and also improves the workability in a production process of an electrochemical element.

DESCRIPTION OF EMBODIMENTS

Hereinafter, the detail of examples of an embodiment according to the present invention will be described.

Various materials and the composition ratios thereof have been studied in addition to examples of the present embodiment and Examples. As a result, it has been found that when a separator has an average fiber length in the range of 0.25 to 0.80 mm, an average fiber width in the range of 3 to 35 μm, and a value in the range of 15 to 70, the value being calculated by dividing the average fiber length by the average fiber width, the denseness can be increased without deterioration of the strength of the separator, thereby providing a good separator having high shielding performance even with small thickness. Thus, according to the present embodiment, a thin separator having a thickness of 3 to 30 μm, good shielding performance, and low resistance, which has been difficult to be realized, can be obtained.

This separator is preferably formed into a sheet by a papermaking method. Examples of the type of the papermaking method include fourdrinier-type, tanmo-type, cylinder-type, and a combination of the above. The separator preferably has at least one layer made by a fourdrinier papermaking method to improve the denseness.

Regenerated cellulose fibers become gradually shortened by beating. The rate of the shortening of the fibers is rapid in the early stage of beating and becomes moderate from the middle to end stage of beating.

Fine fibrils are generated on the surface of the regenerated cellulose fibers by the beating. As a result, the apparent width of the fibers increases. When the beating further continues, the generated fibrils are removed from the main parts of the regenerated cellulose fibers, and thus the average fiber width does not increase more than a certain value and may rather decrease.

In other words, in the early stage of beating, the average fiber length decreases, and the average fiber width increases by beating. From the middle to end stage of the beating, the average fiber length moderately decreases, and the average fiber width does not change or decreases.

It has been found that setting the average fiber length in the range of 0.25 to 0.80 mm and the average fiber width in the range of 3 to 35 μm is effective to improve the denseness and strength of a separator.

When the average fiber length of beaten regenerated cellulose fibers is in the range of 0.25 to 0.80 mm, physical entanglement of the fibers and homogeneity of the sheet are simultaneously achieved. If the average fiber length is less than 0.25 mm, physical entanglement of the fibers excessively decreases in an amount and does not contribute to the improvement or retention of the strength. If the average fiber length is more than 0.80 mm, homogeneity of the sheet decreases. Furthermore, the average fiber length is preferably 0.30 mm or more because the stability and yield in a papermaking process improve.

When the average fiber width of the beaten regenerated cellulose fibers is in the range of 3 to 35 μm, the strength is improved to the maximum because fibrils are sufficiently generated from the stem portions of the fibers.

When the average fiber width is less than 3 μm, fibrils are not generated from the fibers, or the generated fibrils are removed. If the average fiber width is more than 35 μm, the fibers are excessively thick and thus the thickness of the separator cannot be reduced. Furthermore, the average fiber width is preferably 6 μm or more because the stability and yield in a papermaking process improve.

The term "average fiber length" refers to length-weighted mean length described in JIS P 8226-2 "Pulps—Determination of fibre length by automated optical analysis—Part 2: Unpolarized light method" (ISO16065-2). An apparatus measuring the length-weighted mean length captures images of fibers and typically determines and outputs the apparent width of the fibers while determining the length thereof.

In the present invention, the average fiber width refers to an apparent average fiber width determined from the frequency distribution with a class width of 2 μm by the same calculation as for the length-weighted mean length.

The apparent fiber width herein refers to the width of the stem portions of the beaten fibers and the fibrils branching out from the stem portions.

The present invention also focuses on the balance between fine fibrils generated on the surface of the fibers and the fiber length. Specifically, the value calculated by dividing the average fiber length by the average fiber width (hereinafter, in examples of the present embodiment, this value is defined as value A) is set to 15 to 70, so that the strength is highly retained without deteriorating the denseness.

If the value A exceeds 70, the amount of stem portions is large relative to that of fibrils of the regenerated cellulose fibers, and thus the fibrils do not have a sufficient effect to reinforce the stem portions and thus the strength is not improved. In other words, this is the case where the amount of fibrils is small relative to that of stem portions of the beaten regenerated cellulose fibers and thus the denseness is not increased.

The value A is preferably 15 or more. The value A becomes lower than 15 when fibers are considerably shortened by beating, and most of fibrils are removed from stem portions or when fibers are short from the beginning (before beating), and beating does not proceed enough. Removed fibrils are considerably fine fibers, so that they fall through a papermaking wire, and the denseness of a sheet does not improve. In addition, the removed fibrils do not connect to the stem portions, so that the strength is less likely to improve. When fibers are short from the beginning, and beating does not proceed enough, the strength and denseness do not improve as well.

The separator according to the present embodiment simultaneously satisfying the above ranges of the value A and the average fiber length has the highest denseness and strength as a separator including beaten regenerated cellulose fibers, thereby providing a low-resistance separator having sufficient strength and shielding performance for use even if the thickness is reduced.

It is important to keep the average fiber width wide in order to make the average fiber length in the range of 0.25 to 0.80 mm, the average fiber width in the range of 3 to 35 μm, and value A in the range of 15 to 70.

If the average fiber width is narrow relative to the average fiber length, the value A increases. If the value A is tried to be controlled in the range of 15 to 70 with the narrow average fiber width, the average fiber length decreases excessively.

For example, the separator according to the present embodiment can be obtained by controlling the concentration of materials and the total load during beating.

When being beaten in high concentration, fibers are reduced in size by friction between fibers rather than by cutting with blades. Thus, fibrillation is more promoted than shortening of fibers during beating, and fibers can be shortened while keeping the average fiber width wide. When the material concentration is low, shortening of fibers is more promoted, and thus fibrils are less likely to be generated, and the generated fibrils are removed by application of cutting force of blades.

As a result of testing and investigating various concentrations during beating, it has been found that the concentration in the early stage of beating is preferably 5 to 15 mass %, and the concentration from the middle to end stage of beating is preferably 2 to 8 mass %.

Although the concentration during beating may be measured by using various concentration meters and by various methods, in examples of the present embodiment, the concentration was determined by drying a 50-g material subjected to beating and determining the difference in mass between before and after the beating.

Specifically, this was performed with the following formula.

$$C=(W/50)\times100$$

Here, C represents the concentration (mass %) during beating, and W represents mass of the material after drying (absolute dry mass).

The early stage of beating according to examples of the present embodiment refers to a period that ends when the average fiber length has been shortened to 60% of that before beating, and the subsequent period is referred to as the middle to end stage of beating.

Furthermore, controlling the total load during beating is also important.

The total load according to examples of the present embodiment is a value calculated by dividing the electric power that has been used from the early stage to the end of beating by the material weight, and the unit is kWh/kg.

As a result of testing and investigating various total loads during beating, it has been found that the total load is preferably in the range of 1 to 15 kWh/kg. The average fiber length, the average fiber width, and the value A can be controlled in the predetermined ranges by controlling the total load during beating in the above range in addition to the concentration during beating.

When the value A of the beaten regenerated cellulose fibers is 70 or lower, the fibrillation of fibers has been considerably promoted, and furthermore, the fibrils are connected to the fibers. Thus, although each hydrogen bond that binds the fibrils is weak, the maximum number of hydrogen bonds is generated, and the fibrils together support the stem portions of the regenerated cellulose fibers at the root of the fibrils, thereby improving the strength.

The apparatus used for beating fibers may be any apparatus, provided that it is typically used for preparing materials for papermaking. Typical examples of the apparatus include a beater, a conical refiner, a disk refiner, and a high-pressure homogenizer.

Examples of the regenerated cellulose fiber usable for the separator according to the present invention include polynosic rayon and solvent-spun rayon represented by lyocell; however, the regenerated cellulose fiber is not limited to such examples, and any regenerated cellulose fiber may be used, provided that it can be subjected to beating.

The fiber length before beating may be any length; however, if the fiber length in the early stage is excessively long, the fibers are entangled with each other during beating, and uniform beating is less likely to be performed; and if the fiber length is excessively short, imbalance between the average fiber length and the average fiber width occurs after beating, and the value A is likely to be out of the preferable range. Thus, the fiber length in the early stage is preferably 1 to 8 mm.

The fiber width before beating may also be any width; however, if the fiber width in the early stage is excessively wide, a thin separator cannot be provided; and if the fiber width in the early stage is excessively narrow, imbalance between the average fiber length and the average fiber width occurs after beating, and the value A is likely to be out of the preferable range. Thus, the fiber width in the early stage is preferably 3 to 20 µm.

Natural cellulose fibers are not preferably used as a material because the resistance deteriorates. The use of synthetic fibers deteriorates the strength because synthetic fibers do not have hydrogen bonds, which is different from regenerated cellulose fibers, and also deteriorates the denseness because synthetic fibers do not have fibrils. Thus, synthetic fibers do not have sufficient shielding performance when used as a separator, and the number of short-circuit defects increases. Even if fibrillated synthetic fibers are used, they also do not have hydrogen bonds and are not preferred.

During a papermaking process of the separator according to the present invention, an additive typically used in a papermaking process, such as a dispersant, an antifoamer, or a paper strength additive, may be used, if necessary. Coating with a paper strength additive such as polyacrylamide, may be performed, if necessary.

The separator according to the present invention preferably has a thickness of 3 to 30 µm. The separator may be subjected to calendering to control the thickness, if necessary.

If the thickness falls below 3 µm, the number of failures, such as short-circuit defects of an electrochemical element and breakage in a winding process, increases even if the separator has an average fiber length and a value A in preferable ranges because shielding performance and strength are insufficient.

If the thickness exceeds 30 µm, the separator is less likely to contribute to the size reduction, capacity increase, resistance reduction, and life extension of an electrochemical element.

Furthermore, when the separator has a thickness of 5 to 30 µm, the separator has better shielding performance and is preferred.

From the viewpoint of resistance reduction of an electrochemical element, the lower the density, the more preferable it is; however, if density is excessively low, shielding performance and strength decrease, and the number of failures, such as short-circuit defects and breakage in a winding process, increases. If the density is excessively high, resistance reduction cannot be achieved. Accordingly, the density is preferably in the range of 0.25 to 0.85 g/cm$^3$.

According to the above-mentioned features, the denseness of a separator including beaten regenerated cellulose fibers is increased without deteriorating the strength to thereby provide the separator according to the present invention, the separator having high shielding performance even with small thickness. When this separator is used in an electrochemical element, the capacity increase, size reduction, and resistance reduction of the electrochemical element can be achieved. In addition, the separator of the present embodiment has high strength and is easily handled, thereby improving the productivity and yield of the electrochemical element.

For example, preferred examples of the electrochemical element include capacitors and batteries. Furthermore, examples of the capacitors may include aluminum electrolytic capacitors, electric double layer capacitors, and lithium ion capacitors. Examples of the batteries may include lithium primary batteries and lithium ion secondary batteries. In the description below, capacitors and a battery, specifically, an electric double layer capacitor, an aluminum electrolytic capacitor, and a lithium ion secondary battery will be described as examples of electrochemical elements using the separator according to the present embodiment. However, this does not preclude application to other electrochemical elements. In each example of the present embodiment, a wound-type electrochemical element will be described, but the separator can also be used in other electrochemical elements, such as laminate-type, produced by other methods.

An electrochemical element including the separator for an electrochemical element according to the present invention is formed by impregnating the separator portion with an electrolytic solution to retain the electrolytic solution and separating both electrodes from each other by using the separator.

The electrolytic solution may be any electrolytic solution, provided that it is typically used. The electrolytic solution is not limited to electrolytic solution that are combinations of solvents and electrolytes described in examples of the present embodiment and may be any electrolytic solution, provided that it is typically used.

[Evaluation Method of Separator and Electrochemical Element]

Specific properties of the separators and electrochemical elements in examples of the present embodiment were evaluated by the following method under the following conditions.

[Concentration During Beating]

The concentration during beating was determined by drying 50 g of a material (an aqueous dispersion) subjected to beating and determining the difference in mass before and after the beating.

Specifically, this is performed with the following formula.

$$C=(W/50)\times100$$

Here, C represents concentration (mass %) during beating, and W represents mass of the material after drying (absolute dry mass).

When the concentration during beating is changed, the concentration in the early stage of the beating and the concentration in and after the middle stage of the beating are referred to as the former concentration and the latter concentration, respectively.

[Total Load]

The total load was determined by dividing the electric power consumed from the beginning to end of the beating by the mass of a beaten material.

[Average Fiber Length]

The average fiber length refers to a length-weighted mean length measured by using Fiber Tester Code 912 (manufactured by Lorentzen & Wettre Ltd.) in conformity with JIS P 8226-2 "Pulps—Determination of fibre length by automated optical analysis—Part 2: Unpolarized light method" (ISO16065-2).

[Average Fiber Width]

Regarding the average fiber width, the fiber width was first measured by using an apparatus described in JIS P 8226-2 "Pulps—Determination of fibre length by automated optical analysis—Part 2: Unpolarized light method" (ISO16065-2), which was Fiber Tester Code 912 (manufactured by Lorentzen & Wettre Ltd.). Next, the frequency distribution with a class width of 2 μm was produced from the data of the measurements, and then the average fiber width was determined by the same calculation as for the length-weighted mean length.

The formula used in the calculation is as follows.

$$Wl=\Sigma n_i^2 w_i/\Sigma n_i w_i$$

Here, Wl represents the average fiber width (μm); $n_i$ represents the number of fibers classified in the i-th class; and $w_i$ represents the center value (μm) of the i-th class.

In the present invention, the fiber width per class is 2 μm. Thus, for example, fibers having a fiber width of more than 2 μm and 4 μm or less are counted in the second class, and the center value of the class is 3 μm. When five fibers are counted in this class, $n_2=5$, and $w_2=3$.

[Value Calculated by Dividing Average Fiber Length by Average Fiber Width (Value A)]

Value A was calculated by dividing the average fiber length by the average fiber width.

[Thickness]

The thickness of a separator was measured by using a micrometer in "5.1.1 Measuring Apparatus and Measuring Method a In Case Where External Micrometer Is Used" provided in "JIS C 2300-2, 'cellulosic papers for electrical purposes—Part 2: Methods of test', 5.1 Thickness" and by a method of repeatedly folding paper onto itself to form 10 layers, which is described in "5.1.3 In case where thickness of paper by using folded paper is measured".

[Density]

The density of the separator under the absolute dry condition was measured by a method provided in Method B in "JIS C 2300-2 'Cellulosic papers for electrical purposes—Part 2: Methods of test' 7.0A Density".

[Method for Producing Electric Double Layer Capacitor]

Regarding an electric double layer capacitor, an electric double layer capacitor element was obtained by winding activated carbon electrodes and a separator. An electric double layer capacitor was produced by placing the element into an aluminum casing having a closed-end cylinder form, injecting, into the casing, an electrolytic solution obtained by dissolving tetraethylammonium tetrafluoroborate as an electrolyte in a propylene carbonate solvent, performing vacuum impregnation, and then sealing the casing with end-sealing rubber.

[Method for Producing Aluminum Electrolytic Capacitor]

Regarding an aluminum electrolytic capacitor, an aluminum electrolytic capacitor element was obtained by winding an anode aluminum foil and a cathode aluminum foil that had been subjected to etching treatment and oxide film treatment, with a separator being interposed between the foils, so as to avoid contact between the foils. An aluminum electrolytic capacitor was produced by placing the element into an aluminum casing having a closed-end cylinder form, injecting, into the casing, an electrolytic solution obtained by dissolving ammonium adipate as an electrolyte in GBL serving as a solvent, performing vacuum impregnation, and then sealing the casing with end-sealing rubber.

[Method for Producing Lithium Ion Secondary Battery]

Regarding a lithium ion secondary battery, a lithium ion secondary battery element was obtained by providing a lithium cobalt oxide electrode used for a lithium ion secondary battery as a positive electrode material and a graphite electrode as a negative electrode material and winding the electrodes with a separator. A lithium ion secondary battery was produced by placing the element into a casing having a closed-end cylinder form, injecting, into the casing, an electrolytic solution obtained by dissolving a lithium ion and tetrafluoroborate as electrolytes in a propylene carbonate solvent, and sealing the casing by using a press machine.

[Workability During Producing Electrochemical Elements]

While 1000 electrochemical elements of each example were produced, the number of occurrences of separator breakage was counted under the same production conditions. Examples in which the number of occurrences was 1 or less were evaluated as Good; examples in which the number of occurrences was 4 or less were evaluated as Fair; and examples in which the number of occurrences was 5 or more was evaluated as Poor.

[Method for Evaluating Electrochemical Elements]

Evaluation of properties of electrochemical elements according to the present embodiment was specifically performed under the following conditions by the following methods.

[Capacitance]

The capacitance of an electric double layer capacitor was determined by a constant current discharging method in "4.5 Capacitance" provided in "JIS C 5160-1, 'Fixed electric double-layer capacitors for use in electronic equipment—Part 1: Generic specification'".

The capacitance of an aluminum electrolytic capacitor was determined by a method in "4.7 Capacitance" provided in "JIS C 5101-1 'Fixed capacitors for use in electronic equipment—Part 1: Generic specification'".

[Discharge Capacity]

The discharge capacity of a lithium ion secondary battery was measured in conformity with "8.4.1 Discharge performance test" provided in "JIS C 8715-1 'Secondary lithium cells and batteries for use in industrial applications—Part 1: Tests and requirements of performance'".

[Internal Resistance]

The internal resistance of an electric double layer capacitor was measured by the alternating current (a.c.) resistance method in "4.6 Internal resistance" provided in "JIS C 5160-1 'Fixed electric double layer capacitors for use in electronic equipment—Part 1: Generic specification'".

The internal resistance of a lithium ion secondary battery was measured in conformity with "8.6.3 Alternating current internal resistance" provided in "JIS C 8715-1 'Secondary lithium cells and batteries for use in industrial applications- Part 1: Tests and requirements of performance'".

[Impedance]

The resistance of an aluminum electrolytic capacitor was determined by a method in "4.10 Impedance" provided in "JIS C 5101-1 'Fixed capacitors for use in electronic equipment—Part 1: Generic specification'".

[Ratio of Short-Circuit Defects]

The ratio of short-circuit defects of an electrochemical element was determined by regarding a case in which the charging voltage did not increase to the rated voltage as a short-circuit defect, dividing the number of electrochemical elements in which such a short-circuit defect occurred by the number of produced electrochemical elements, and expressing the resultant in percentage.

EXAMPLES

Hereinafter, specific examples according to the present invention, comparative examples, and related examples will be described.

The separator in each example was formed by using regenerated cellulose fibers by a papermaking method. The size of an electrochemical element is described in a manner of diameter (mm)×height (mm) in this order.

Example 1

Solvent-spun rayon fibers (hereinafter expressed as lyocell), which are regenerated cellulose fibers, were beaten at a former concentration of 5%, a latter concentration of 2%, and a total load of 1 kWh/kg and subjected to a fourdrinier papermaking process to thereby obtain a separator having a thickness of 30.0 μm, a density of 0.40 g/cm$^3$, an average fiber length of 0.79 mm, an average fiber width of 13 μm, and a value A of 60.8.

An electric double layer capacitor having a rated voltage of 2.5 V, a rated capacitance of 100 F, and a cell size of 25 mm×45 mm was produced by using the separator to provide the electric double layer capacitor of Example 1.

Example 2

Lyocell fibers were beaten at a former concentration of 8%, a latter concentration of 4%, and a total load of 3 kWh/kg and subjected to a fourdrinier papermaking process to thereby obtain a separator having a thickness of 25.0 μm, a density of 0.32 g/cm$^3$, an average fiber length of 0.56 mm, an average fiber width of 18 μm, and a value A of 31.1.

An electric double layer capacitor having a rated voltage of 2.5 V, a rated capacitance of 100 F, and a cell size of 25 mm×45 mm was produced by using the separator to provide the electric double layer capacitor of Example 2.

Example 3

Polynosic rayon fibers, which are regenerated cellulose fibers, were beaten at a former concentration of 5%, a latter concentration of 6%, and a total load of 6 kWh/kg and subjected to a fourdrinier papermaking process to thereby obtain a separator having a thickness of 20.0 μm, a density of 0.50 g/cm$^3$, an average fiber length of 0.63 mm, an average fiber width of 11 μm, and a value A of 57.3.

An electric double layer capacitor having a rated voltage of 2.5 V, a rated capacitance of 300 F, and a cell size of 35 mm×60 mm was produced by using the separator to provide the electric double layer capacitor of Example 3.

Example 4

Lyocell fibers were beaten at a concentration of 6% and a total load of 7 kWh/kg, subjected to a fourdrinier papermaking process, and then processed by calendering to thereby obtain a separator having a thickness of 20.0 μm, a density of 0.83 g/cm$^3$, an average fiber length of 0.54 mm, an average fiber width of 35 μm, and a value A of 15.4.

An electric double layer capacitor having a rated voltage of 2.5 V, a rated capacitance of 300 F, and a cell size of 25 mm×45 mm was produced by using the separator to provide the electric double layer capacitor of Example 4.

Example 5

Lyocell fibers were beaten at a former concentration of 6%, a latter concentration of 2%, and a total load of 4 kWh/kg and subjected to a fourdrinier papermaking process to thereby obtain a separator having a thickness of 15.0 µm, a density of 0.50 g/cm$^3$, an average fiber length of 0.42 mm, an average fiber width of 6 µm, and a value A of 70.0.

An electric double layer capacitor having a rated voltage of 2.5 V, a rated capacitance of 3000 F, and a cell size of 60 mm×140 mm was produced by using the separator to provide the electric double layer capacitor of Example 5.

Example 6

Lyocell fibers were beaten at a former concentration of 8%, a latter concentration of 3%, and a total load of 11 kWh/kg, subjected to a fourdrinier papermaking process, and then processed by calendering to thereby obtain a separator having a thickness of 10.0 µm, a density of 0.70 g/cm$^3$, an average fiber length of 0.78 mm, an average fiber width of 33 µm, and a value A of 23.6.

An electric double layer capacitor having a rated voltage of 2.5 V, a rated capacitance of 3000 F, and a cell size of 60 mm×140 mm was produced by using the separator to provide the electric double layer capacitor of Example 6.

Example 7

Lyocell fibers were beaten at a former concentration of 12%, a latter concentration of 7%, and a total load of 9 kWh/kg and subjected to a fourdrinier papermaking process to thereby obtain a separator having a thickness of 10.0 µm, a density of 0.50 g/cm$^3$, an average fiber length of 0.36 mm, an average fiber width of 23 µm, and a value A of 15.7.

An electric double layer capacitor having a rated voltage of 2.5 V, a rated capacitance of 3000 F, and a cell size of 60 mm×140 mm was produced by using the separator to provide the electric double layer capacitor of Example 7.

Example 8

Lyocell fibers were beaten at a former concentration of 11%, a latter concentration of 6%, and a total load of 10 kWh/kg, subjected to a fourdrinier papermaking process, and then processed by calendering to thereby obtain a separator having a thickness of 5.0 µm, a density of 0.60 g/cm$^3$, an average fiber length of 0.26 mm, an average fiber width of 4 µm, and a value A of 65.0.

An electric double layer capacitor having a rated voltage of 2.5 V, a rated capacitance of 3000 F, and a cell size of 60 mm×140 mm was produced by using the separator to provide the electric double layer capacitor of Example 8.

Example 9

Lyocell fibers were beaten at a former concentration of 15%, a latter concentration of 8%, and a total load of 15 kWh/kg, subjected to a fourdrinier papermaking process, and then processed by calendering to thereby obtain a separator having a thickness of 3.0 µm, a density of 0.83 g/cm$^3$, an average fiber length of 0.25 mm, an average fiber width of 15 µm, and a value A of 16.7.

An electric double layer capacitor having a rated voltage of 2.5 V, a rated capacitance of 3000 F, and a cell size of 60 mm×140 mm was produced by using the separator to provide the electric double layer capacitor of Example 9.

Comparative Example 1

Lyocell fibers were beaten at a former concentration of 15%, a latter concentration of 4%, and a total load of 2 kWh/kg and subjected to a fourdrinier papermaking process to thereby obtain a separator having a thickness of 35.0 µm, a density of 0.43 g/cm$^3$, an average fiber length of 0.64 mm, an average fiber width of 38 µm, and a value A of 16.8.

An electric double layer capacitor having a rated voltage of 2.5 V, a rated capacitance of 100 F, and a cell size of 25 mm×45 mm was produced by using the separator to provide the electric double layer capacitor of Comparative Example 1.

Comparative Example 2

Lyocell fibers (90 mass %) were beaten at a former concentration of 6%, a latter concentration of 3%, and a total load of 3 kWh/kg, mixed with 10 mass % of unbeaten softwood pulp and subjected to a fourdrinier papermaking process to thereby obtain a separator having a thickness of 25.0 µm, a density of 0.40 g/cm$^3$, an average fiber length of 0.60 mm, an average fiber width of 25 µm, and a value A of 24.0.

An electric double layer capacitor having a rated voltage of 2.5 V, a rated capacitance of 100 F, and a cell size of 25 mm×45 mm was produced by using the separator to provide the electric double layer capacitor of Comparative Example 2.

Comparative Example 3

Lyocell fibers (90 mass %) were beaten at a former concentration of 6%, a latter concentration of 3%, and a total load of 3 kWh/kg, mixed with 10 mass % of fibrillated aramid fibers, subjected to a fourdrinier papermaking process, and then processed by calendering to thereby obtain a separator having a thickness of 20.0 µm, a density of 0.60 g/cm$^3$, an average fiber length of 0.55 mm, an average fiber width of 22 µm, and a value A of 25.0.

An electric double layer capacitor having a rated voltage of 2.5 V, a rated capacitance of 300 F, and a cell size of 35 mm×60 mm was produced by using the separator to provide the electric double layer capacitor of Comparative Example 3.

Comparative Example 4

Lyocell fibers were beaten at a former concentration of 8%, a latter concentration of 3%, and a total load of 0.5 kWh/kg and subjected to a fourdrinier papermaking process to thereby obtain a separator having a thickness of 20.0 µm, a density of 0.45 g/cm$^3$, an average fiber length of 0.82 mm, an average fiber width of 20 µm, and a value A of 41.0.

An electric double layer capacitor having a rated voltage of 2.5 V, a rated capacitance of 300 F, and a cell size of 35 mm×60 mm was produced by using the separator to provide the electric double layer capacitor of Comparative Example 4.

Comparative Example 5

Lyocell fibers were beaten at a concentration of 4% and a total load of 10 kWh/kg and subjected to a fourdrinier papermaking process to thereby obtain a separator having a thickness of 15.0 µm, a density of 0.47 g/cm³, an average fiber length of 0.71 mm, an average fiber width of 9 µm, and a value A of 78.9.

An electric double layer capacitor having a rated voltage of 2.5 V, a rated capacitance of 300 F, and a cell size of 35 mm×60 mm was produced by using the separator to provide the electric double layer capacitor of Comparative Example 5.

Comparative Example 6

Lyocell fibers were beaten at a former concentration of 8%, a latter concentration of 6%, and a total load of 17 kWh/kg and subjected to a fourdrinier papermaking process to thereby obtain a separator having a thickness of 10.0 µm, a density of 0.50 g/cm³, an average fiber length of 0.23 mm, an average fiber width of 7 µm, and a value A of 32.9.

An electric double layer capacitor having a rated voltage of 2.5 V, a rated capacitance of 3000 F, and a cell size of 60 mm×140 mm was produced by using the separator to provide the electric double layer capacitor of Comparative Example 6.

Comparative Example 7

Lyocell fibers were beaten at a former concentration of 15%, a latter concentration of 10%, and a total load of 15 kWh/kg, subjected to a fourdrinier papermaking process, and then processed by calendering to thereby obtain a separator having a thickness of 10.0 µm, a density of 0.70 g/cm³, an average fiber length of 0.28 mm, an average fiber width of 20 µm, and a value A of 14.0.

An electric double layer capacitor having a rated voltage of 2.5 V, a rated capacitance of 3000 F, and a cell size of 60 mm×140 mm was produced by using the separator to provide the electric double layer capacitor of Comparative Example 7.

Comparative Example 8

Lyocell fibers were beaten at a former concentration of 15%, a latter concentration of 8%, and a total load of 15 kWh/kg, subjected to a fourdrinier papermaking process, and then processed by calendering to thereby obtain a separator having a thickness of 2.5 µm, a density of 0.88 g/cm³, an average fiber length of 0.35 mm, an average fiber width of 13 µm, and a value A of 26.9.

An electric double layer capacitor having a rated voltage of 2.5 V, a rated capacitance of 3000 F, and a cell size of 60 mm×140 mm was produced by using the separator to provide the electric double layer capacitor of Comparative Example 8.

Example 10

An aluminum electrolytic capacitor having a rated voltage of 63 V, a rated capacitance of 120 µF, and a capacitor size of 10 mm×20 mm was produced by using the same separator as in Example 4 to provide the aluminum electrolytic capacitor of Example 10.

Example 11

A lithium ion secondary battery having a rated voltage of 3.7 V, a rated capacity of 2200 mA, and a cell size of 18 mm×65 mm was produced by using the same separator as in Example 5 to provide the lithium ion secondary battery of Example 11.

The regenerated cellulose fibers used in Examples and Comparative Examples 2 to 8 have an average fiber length of 1 to 8 mm and an average fiber width of 3 to 20 µm before beating.

Table 1 shows the fiber names and mixing ratios of the materials, various physical properties of the obtained separators, workability during production of the electric double layer capacitors, and evaluation results of the electric double layer capacitors in Examples 1 to 9 and Comparative Examples 1 to 8.

TABLE 1

| | Material | | Separator | | | | | | Electric double layer capacitor | | |
| | | | | | | | | | | | Short-circuit |
| | Fiber name | Mixing ratio % | Thickness µm | Density g/cm³ | Average fiber length mm | Average fiber width µm | Value A | Workability | Capacitance F | Internal resistance mΩ | defect ratio % |
|---|---|---|---|---|---|---|---|---|---|---|---|
| Example 1 | Lyocell | 100 | 30 | 0.40 | 0.79 | 13 | 60.8 | Good | 100 | 6.0 | 0.0 |
| Example 2 | Lyocell | 100 | 25 | 0.32 | 0.56 | 18 | 31.1 | Good | 100 | 5.5 | 0.1 |
| Example 3 | Polynosic | 100 | 20 | 0.50 | 0.63 | 11 | 57.3 | Good | 300 | 4.2 | 0.1 |
| Example 4 | Lyocell | 100 | 20 | 0.83 | 0.54 | 35 | 15.4 | Good | 300 | 4.5 | 0.0 |
| Example 5 | Lyocell | 100 | 15 | 0.50 | 0.42 | 6 | 70.0 | Good | 3000 | 0.4 | 0.2 |
| Example 6 | Lyocell | 100 | 10 | 0.70 | 0.78 | 33 | 23.6 | Good | 3000 | 0.3 | 0.2 |
| Example 7 | Lyocell | 100 | 10 | 0.50 | 0.36 | 23 | 15.7 | Good | 3000 | 0.2 | 0.3 |
| Example 8 | Lyocell | 100 | 5 | 0.60 | 0.26 | 4 | 65.0 | Good | 3000 | 0.3 | 0.3 |
| Example 9 | Lyocell | 100 | 3 | 0.83 | 0.25 | 15 | 16.7 | Good | 3000 | 0.4 | 0.4 |
| Comparative Example 1 | Lyocell | 100 | 35 | 0.43 | 0.64 | 38 | 16.8 | Good | 100 | 7.3 | 0.0 |
| Comparative Example 2 | Lyocell Softwood | 90 10 | 25 | 0.40 | 0.6 | 25 | 24.0 | Good | 100 | 8.4 | 0.8 |
| Comparative Example 3 | Lyocell Aramid | 90 10 | 20 | 0.60 | 0.55 | 22 | 25.0 | Poor | 300 | 5.1 | 1.3 |
| Comparative Example 4 | Lyocell | 100 | 20 | 0.45 | 0.82 | 20 | 41.0 | Good | 300 | 4.5 | 1.1 |
| Comparative Example 5 | Lyocell | 100 | 15 | 0.47 | 0.71 | 9 | 78.9 | Poor | 300 | 4.4 | 1.2 |

TABLE 1-continued

| | Material | | Separator | | | | | | Electric double layer capacitor | | |
| --- | --- | --- | --- | --- | --- | --- | --- | --- | --- | --- | --- |
| | Fiber name | Mixing ratio % | Thickness μm | Density g/cm³ | Average fiber length mm | Average fiber width μm | Value A | Workability | Capacitance F | Internal resistance mΩ | Short-circuit defect ratio % |
| Comparative Example 6 | Lyocell | 100 | 10 | 0.50 | 0.23 | 7 | 32.9 | Poor | 3000 | 0.3 | 0.5 |
| Comparative Example 7 | Lyocell | 100 | 10 | 0.70 | 0.28 | 20 | 14.0 | Fair | 3000 | 0.4 | 0.9 |
| Comparative Example 8 | Lyocell | 100 | 2.5 | 0.88 | 0.35 | 13 | 26.9 | Poor | 3000 | 0.7 | 1.1 |

Table 2 shows the fiber name and mixing ratio of the material, various physical properties of the obtained separators, workability during production of the aluminum electrolytic capacitors, and evaluation results of the aluminum electrolytic capacitors in Example 10.

further increase the internal resistance value contrarily. If the thickness is reduced by decreasing the basis weight without changing the density, shielding performance deteriorates, thereby probably increasing the number of short-circuit defects.

TABLE 2

| | Material | | Separator | | | | | | Aluminum electrolytic capacitor | | |
| --- | --- | --- | --- | --- | --- | --- | --- | --- | --- | --- | --- |
| | Fiber name | Mixing ratio % | Thickness μm | Density g/cm³ | Average fiber length mm | Average fiber width μm | Value A | Workability | Capacitance μF | Impedance Ω | Short-circuit defect ratio % |
| Example 10 | Lyocell | 100 | 20 | 0.83 | 0.54 | 35 | 15.4 | Good | 120 | 0.15 | 0.0 |

Table 3 shows the fiber name and mixing ratio of the material, various physical properties of the obtained separators, workability during production of the lithium ion secondary batteries, and evaluation results of the lithium ion secondary batteries in Example 11.

From Examples and Comparative Example 1, it has been found that the thickness of the separator is preferably 30 μm or less.

The separator of Comparative Example 2 includes 10 mass % of the softwood pulp. Thus, the internal resistance

TABLE 3

| | Material | | Separator | | | | | | Lithium ion secondary battery | | |
| --- | --- | --- | --- | --- | --- | --- | --- | --- | --- | --- | --- |
| | Fiber name | Mixing ratio % | Thickness μm | Density g/cm³ | Average fiber length mm | Average fiber width μm | Value A | Workability | Discharge capacity mA | Internal resistance mΩ | Short-circuit defect ratio % |
| Example 11 | Lyocell | 100 | 15 | 0.50 | 0.42 | 6 | 70.0 | Good | 2200 | 0.4 | 0.2 |

The electric double layer capacitors of Examples 1 to 9 are evaluated as "Good" in terms of workability during production of the electrochemical elements. The ratios of short-circuit defects are 0.0 to 0.4%, which are less than 1% and low. Furthermore, the internal resistance values are sufficiently low.

On the other hand, the separator of Comparative Example 1 has a large thickness of 35.0 μm. Thus, the internal resistance value of the electric double layer capacitor deteriorates by 20% or more relative to the internal resistance values in Examples having the same capacitance as in Comparative Example. If the thickness of the separator is reduced by calendering, the density increases to thereby deteriorates by 20% or more relative to that in Examples having the same capacitance as in Comparative Example 2. In addition, the ratio of short-circuit defects is 0.8%, which does not reach 1%, but is higher than those in Examples. If the softwood pulp is beaten to reduce the ratio of short-circuit defects to those in Examples, the resistance value is expected to further deteriorate.

The separator of Comparative Example 3 includes 10 mass % of fibrillated aramid fibers. The fibrillated aramid fibers do not have hydrogen bonds, and thus the strength of the sheet deteriorates. Accordingly, workability during production of the electric double layer capacitor deteriorated (Poor). From the same reason, the shielding performance decreased, and thus the ratio of short-circuit defects increased.

From Comparative Examples 2 and 3, it has been found that the separator including beaten regenerated cellulose fibers alone is preferred.

The separator of Comparative Example 4 has a low total load of 0.5 kWh/kg during beating and an average fiber length of 0.82 mm. This is probably because the fibrillation was insufficient due to the low total load and insufficient application of beating energy to the fibers. Accordingly, the formed sheet has a low denseness, and the sheet serving as a separator has poor shielding performance. As a result, the ratio of short-circuit defects was 1% or more.

The separator of Comparative Example 6 had a high total load of 17 kWh/kg during beating and an average fiber length of 0.23 mm. This is probably because excessive beating energy was applied to the fibers due to the large total load. As a result, the strength of the separator decreased, and the workability deteriorated (Poor).

From Examples and Comparative Examples 4 and 6, it has been found that the average fiber length is preferably in the range of 0.25 to 0.80 mm.

The separator of Comparative Example 5 is a separator produced by a conventional technique and has a value A of 78.9. This is probably because the fibrillation was insufficient due to a low former concentration of 4% and shortening of lyocell fibers predominantly promoted during beating. Accordingly, shielding performance and strength were insufficient with such a small thickness. As a result, the workability deteriorated (Poor), and the number of short-circuit defects increased.

The electric double layer capacitors in Example 5 and Comparative Example 5 include separators having the same thickness and had different capacitance. As shown in these Examples, the capacitance increase of an electric double layer capacitor is achieved by using this invention. When the winding length is kept to be the same without increasing the capacitance, the wound element can be reduced in size because capacitance is in proportion to the winding length of electrode materials.

The separator of Comparative Example 7 has a value A of 14.0. This is probably because the latter concentration during beating was 10%, which was high. Fluidity of materials increases due to generation of the fibrils in water during beating. Thus, from the middle to end stage of beating, fibrillation due to friction among fibers is less likely to occur. In this case, beating in high concentration was continued until a desired average fiber length was achieved, and the average fiber width decreased, rather than increased, probably because the amount of fallen fibrils that had generated in the early stage of beating increased. As a result, the strength was slightly insufficient, and the workability deteriorated (Fair). In addition, the shielding performance became insufficient, and thus the ratio of short-circuit defects exceeded 0.5%.

From Examples and Comparative Examples 5 and 7, it has been found that the value A is preferably in the range of 15 to 70.

The separator of Comparative Example 8 has a thin thickness of 2.5 µm. Accordingly, the strength was low, the workability deteriorated (Poor), and the number of short-circuit defects increased though the separator had a high density of 0.88 g/cm$^3$. This has demonstrated that the separator preferably has a thickness of 3 µm or more. Due to the high density, the internal resistance of the electric double layer capacitor deteriorated by 20% or more relative to that in Examples having the same capacitance as in Comparative Example 8. From this, it has been found that the separator preferably has a density of 0.85 g/cm$^3$ or less.

Furthermore, comparison between Example 8 and Example 9 reveals that the ratio of short-circuit defects in Example 8 is low. From this, it has been found that the separator preferably has a thickness of 5 µm or more.

It has been found that in order to set the average fiber length, the average fiber width, and the value A in the ranges described above, controlling the concentration and the total load during beating is important. The average fiber length, the average fiber width, and the value A fall in the above described ranges by setting the former concentration to 5 to 15%, the latter concentration to 2 to 8%, and the total load to 1 to 15 kWh/kg.

Furthermore, even if the latter concentration is high as in Example 3, or the whole latter concentration is, as in Example 4, the same, it has been found that whole latter concentration during beating is preferably in this range.

From Example 10 and Example 11, such an electrochemical element works without any problems even in an aluminum electrolytic capacitor or in a lithium ion secondary battery.

As described above, according to examples of the present embodiment, the concentration during beating and the total load during beating are controlled, so that the average fiber length is set to 0.25 to 0.80 mm, the average fiber width is set to 3 to 35 µm, and a value A is set to 15 to 70. The average fiber length, the average fiber width, and the value A are set to fall in these ranges, so that there is provided the separator having sufficient strength to avoid the deterioration of workability in a production process of an electrochemical element, excellent shielding performance, and low resistance, even with a considerably thin thickness of 30 µm or less.

The resistance reduction, capacity increase, size reduction, and life extension of an electrochemical element are achieved due to the use of the separator.

The separator according to the present invention can be preferably used in various electrochemical elements that are required to have high shielding performance and small thickness, such as lithium ion capacitors and lithium primary batteries, in addition to the electric double layer capacitors, the aluminum electrolytic capacitor, and the lithium ion secondary battery that are described in examples of the present embodiment.

The invention claimed is:

1. A separator for an electrochemical element, the separator being interposed between a pair of electrodes and having retainability of an electrolytic solution including an electrolyte, the separator comprising fibers, wherein the fibers are only regenerated cellulose fibers, the regenerated cellulose fibers having an average fiber length of 250 µm to 800 µm, an average fiber width of 3 µm to 35 µm, and a value of 15 to 70, the value being calculated by dividing the average fiber length by the average fiber width, and wherein the separator has a thickness of 3 to 30 µm.

2. An electrochemical element comprising the separator for an electrochemical element according to claim 1.

3. The electrochemical element according to claim 2, being an electric double layer capacitor, an aluminum electrolytic capacitor, a lithium ion capacitor, a lithium primary battery, or a lithium ion secondary battery.

* * * * *